May 25, 1965 D. J. RICKARD 3,185,072
JUICE EXTRACTOR
Filed June 21, 1963 6 Sheets-Sheet 1

INVENTOR.
DONN J. RICKARD
BY
Paul A. Weilein
ATTORNEY

May 25, 1965  D. J. RICKARD  3,185,072
JUICE EXTRACTOR

Filed June 21, 1963  6 Sheets-Sheet 2

INVENTOR.
DONN J. RICKARD
BY Paul A. Weilein
ATTORNEY

May 25, 1965 D. J. RICKARD 3,185,072
JUICE EXTRACTOR

Filed June 21, 1963 6 Sheets-Sheet 3

INVENTOR.
DONN J. RICKARD
BY Paul A. Weilein
ATTORNEY

May 25, 1965 D. J. RICKARD 3,185,072
JUICE EXTRACTOR
Filed June 21, 1963 6 Sheets-Sheet 4

INVENTOR.
DONN J. RICKARD
BY Paul A. Weilein
ATTORNEY

INVENTOR.
DONN J. RICKARD
BY Paul A. Weilein
ATTORNEY

May 25, 1965  D. J. RICKARD  3,185,072
JUICE EXTRACTOR

Filed June 21, 1963  6 Sheets-Sheet 6

INVENTOR.
DONN J. RICKARD
BY
Paul A. Weilein
ATTORNEY

United States Patent Office 3,185,072
Patented May 25, 1965

3,185,072
JUICE EXTRACTOR
Donn J. Rickard, Glendora, Calif., assignor to Brown Citrus Machinery Corp., Whittier, Calif., a corporation of California
Filed June 21, 1963, Ser. No. 289,620
33 Claims. (Cl. 100—53)

This invention relates to a citrus fruit juice extractor that is especially constructed for expressing juice from sample quantities of citrus fruit in order that such juice may be tested to determine whether or not the large batch of crop of fruit from which the sample quantity was obtained is of good marketable quality.

In at least one area which produces large quantities of citrus fruit it is necessary that a given crop of fruit test out as containing a predetermined amount of soluble solids before sales of the fruit for the market legally may be made.

Both hand and power operated extractors have been used for test purposes and so far not one of such extractors has been able to produce the maximum amount of juice from each piece of fruit under test with the promptness, thoroughness, and low cost that is desired. Hand operated extractors are slow and uncertain as to uniform extraction results per operation since about forty pounds of fruit should be treated for a reliable crop test and in handling this amount of fruit the extractors are not dependable to account for all the juice available per piece, and therefore in some instances fail to provide for an accurate test as to the fitness of the fruit for the market. Power operated extractors as heretofore used have likewise failed to provide a uniform juice extracting operation per piece of fruit or have produced such a high pulp content in the juice that accurate hydrometer testing could not be carried out. Unless each piece of fruit being tested is treated alike to yield the maximum amount of juice, the resultant juice yield will not make possible a true test as to the fitness of the fruit for the market.

Another objection to extractors such as heretofore available is that they were not constructed to handle fruit with a uniform extracting action per piece derived from whole fruit over a large range of sizes, for example, of the order of from 2 to 6 inches in diameter and in most cases different sized fruit required extractors of different sizes or the substitution of extracting elements according to sizes of the fruit under test.

It is also known that juice extractors for test purpose have been developed to handle fruit halves only or sections of fruit, and this requires use of extraneous slicing or bisecting apparatus or manual reduction of whole fruit to halves or sections before such divided fruit parts can be treated to express test juice therefrom.

It is the primary object of this invention to provide an improved juice extractor for the purpose described, which will solve the problems heretofore encountered with use of test extractors and make it possible quickly to obtain the maximum amount of juice from each piece under test in such a manner that a true test may be made in less time than heretofore and at a reasonably low cost.

It is another object of this invention to provide a juice extractor of the character described, in which the above and other objectives hereof are achieved by a novel arrangement of a frame assembly and a beam assembly connected to one another for relative movement and cooperably connected with novel whole fruit bisecting means and novel means for subjecting the resultant halves of each bisected fruit alike to a particular juice extracting action for a predetermined period of time, all in such a manner that operation of the bisecting means and the extracting means are effected and controlled according to relative movement of the frame and beam assemblies.

It is another object of this invention to provide in an extractor such as described novel means which automatically positions alike the two halves resulting from bisecting each whole piece of citrus fruit within a range of whole fruit sizes from 2 to 6 inches in diameter, and with the centers of the rind sides of the halves substantially in alignment with the axes of a pair of rotary pressure applying members which are operated to rotate while applying juice extractor pressure to the rind sides of halves, to the end that the fruit halves are treated alike to obtain the maximum amount of juice.

Another object of this invention is to provide in an extractor such as described a novel form of holding means for whole fruit which is constructed and arranged to move between a position supporting a whole piece of fruit in position to be bisected, and a position releasing the bisected fruit for gravitation to a location in the apparatus for further treatment, this movement of the holding means being effected in response to relative movement of the frame assembly and the beam assembly which cooperatively support and actuate the fruit holding means.

A further object is the provision in the extractor hereof of a novel means which guides the bisected fruit from the bisecting means in such a manner that the fruit halves will gravitate without rolling or tumbling, and so as to come to rest with the rind side up, in positions in the extractor from which they are centered, by the positioning means beneath the rotary juice extracting members.

Another object hereof is to provide a citrus fruit juice extractor which constitutes an improvement in this art by reason of having embodied therein novel bisecting means that includes as elements thereof a plunger or ram, knife means and means for releasably holding a piece of whole fruit in position to be forced by the ram against the knife means to first bisect the fruit and then release the bisected fruit so that it may be moved into position to have juice expressed therefrom; there being opposed relatively movable members for cooperatively supporting the elements of said bisecting means and which upon relative movement will effect the operation of the bisecting means through the medium of simple mechanical linkage interconnecting the elements of the bisecting means and the relatively movable members.

It is a further object of this invention to provide an extractor such as described which constitutes a compact and highly efficient unit operable for the purpose herein described, in having embodied therein, a frame member and a beam member which are connected by means operable to move the beam member relative to the frame member and wherein whole fruit bisecting means, rotary pressure applying members, and fruit half positioning means are cooperatively supported by and mechanically connected with the beam and frame members in such a manner that upon movement of the beam member relative to the frame member, the bisecting means will bisect a piece of whole fruit, the positioning means will dispose the fruit halves in position to have juice extracted therefrom and the rotary pressure members will be moved into position to apply juice extracting pressure to the halves.

Another object hereof is to provide an extractor such as next above described wherein novel means are operable sequentially and repeatedly to actuate the bisecting means, the fruit half positioning means and the juice extracting means in such a manner that for example, a forty pound sample batch of whole fruit of random sizes may be fed into the extractor one piece at a time and the halves thereof subjected alike to a uniform juice extractor action for yielding all available juice with greater reliability as to the maximum juice yield than possible with test extractors heretofore available.

Other objects and advantages of the invention will be hereinafter described or will become apparent to those skilled in the art, and the novel features of the invention will be defined in the appended claims.

Referring to the drawings.

The illustrative embodiment of this invention as shown in the accompanying drawings generally includes a frame assembly 1 and a beam assembly 2 connected for relative movement and cooperatively connected with fruit bisecting means 3, power operated means 4 for effecting relative movement of the two assemblies, and juice extracting means 5 in such a manner that in response to relative movement of the frame and beam assemblies whole fruit will be bisected and the bisected fruit will have the juice extracted therefrom in a particularly efficacious manner.

It is desired to provide a compact and efficient juice extractor of comparatively low cost which may be operated quickly to obtain from a small test or sample batch of citrus, all of the juice available per piece of fruit so that this juice may be tested to determine whether or not a given crop or large amount of fruit to be sold is suitable for the market. For this purpose the extractor as here shown may be operated continuously to bisect fruit repeatedly fed into the extractor one whole piece of fruit at a time, so that the halves of each whole piece of fruit will be simultaneously subjected to juice extracting pressure in a manner assuring that the maximum amount of juice per half will be obtained.

In the present form of this invention the beam assembly 2 hereinafter referred to as the beam is movable relative to the frame assembly 1, hereinafter referred to as the frame, and this movement is relied upon to bring about operation of the extractor. Accordingly, the means 4 for effecting movement of the beam includes (see FIG. 6) a fluid pressure actuated piston and cylinder unit 6 interposed between and connected to the frame and beam in a manner to be hereinafter fully described.

The bisecting means 3 includes whole fruit holding means 7 carried by the beam 2 for movement between a position holding the fruit to be bisected and a position in which the bisected fruit is released. In addition the bisecting means includes a knife means 8 on the frame and plunger or ram means 9 movable on the beam to force whole fruit in the holding means 7 against the knife means to bisect the fruit.

On the frame 1 is guide means 10 which guides bisected fruit gravitating from the holding means 7 with the rind sides uppermost, onto a pair of platforms 11 on the frame 1.

The juice extracting means 5 includes a pair of rotary pressure applying members 12, a motor 13 and drive means 14 connecting the motor with the members 12, all carried by the beam 2. Cooperative with the rotary members 12 as a part of the extracting means, are a pair of screen members or grids 15 carried by the frame 1 for supporting fruit halves in position to be subjected to the juice extracting action of the rotary members 12. Each grid means 15 includes a screen plate 15a reinforced on the underside by cross members 15b.

Also mounted on the frame 1 are fruit half positioning means 17 operable to move fruit halves from the platforms 11 into position on the grids 15, for having juice expressed therefrom. Following each juice expressing operation of fruit halves, sweep-off means 18 on the frame are operable to remove from the grids 15, the rinds, pulp and seeds which remain on the grids as the juice is screened therethrough and collected for test by suitable means not shown.

The desired sequential operations of the bisecting means 2, the juice extracting means 3 and associated elements of the extractor other than the driving of the rotary pressure applying member 12, are effected by operating and control means both to be hereinafter fully described. As here shown, this operating means mechanically interconnects the frame 1, beam 2, beam carried elements of the bisecting means 3, the fruit half positioning means 17 and the sweep-off means 18 on the frame 1 in such a manner that all operations of the extractor are brought about by movement of the beam 2 between up and down positions on the frame 1, with the aid of the control means which also functions to provide a predetermined dwell of the beam 2 when the rotary pressure applying members 12 are operated to extract juice from bisected fruit on the grids 15.

The frame 1 as here shown comprises a rectangular horizontally disposed main body made up of side members 21, end members 22 joined to the side members and suitable legs 23. Suitable frame members for supporting other elements of the extractor, both to be hereinafter described, are attached to the main body of the frame.

Figure 2:
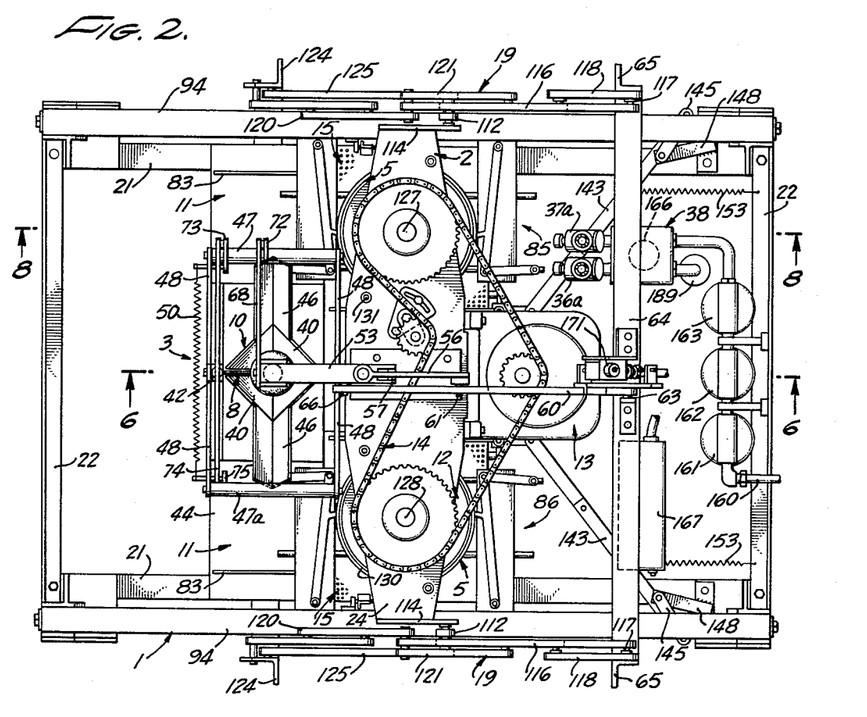
FIG. 2 is a top plan view of the apparatus shown in FIG. 1.
Figure 6:
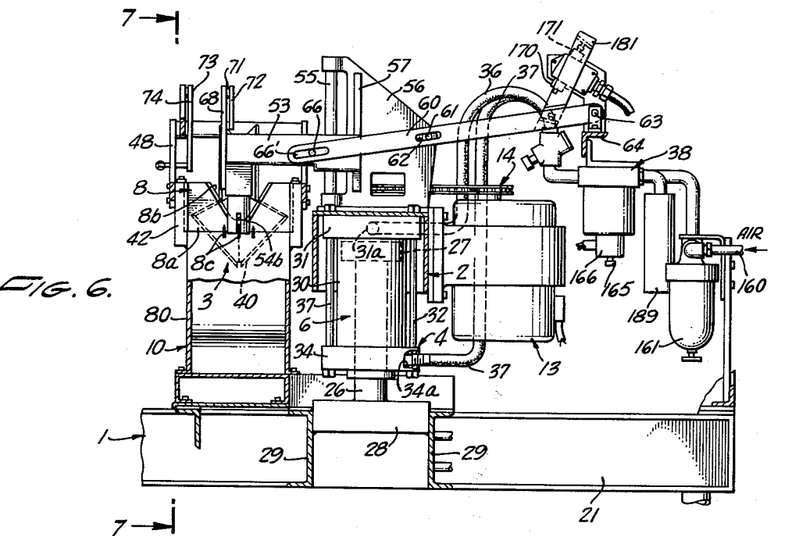
FIG. 6 is a fragmentary sectional view taken on the line 6—6 of FIG. 2.
Figure 7:
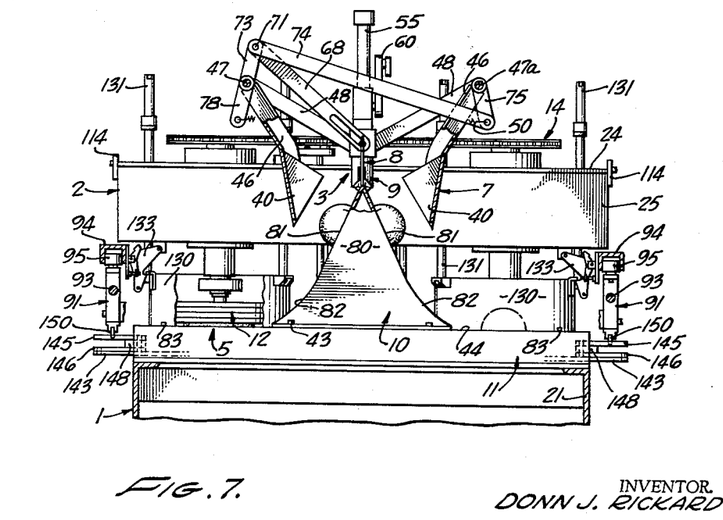
FIG. 7 is a fragmentary sectional view taken on the line 7—7 of FIG. 6.
Figure 8:
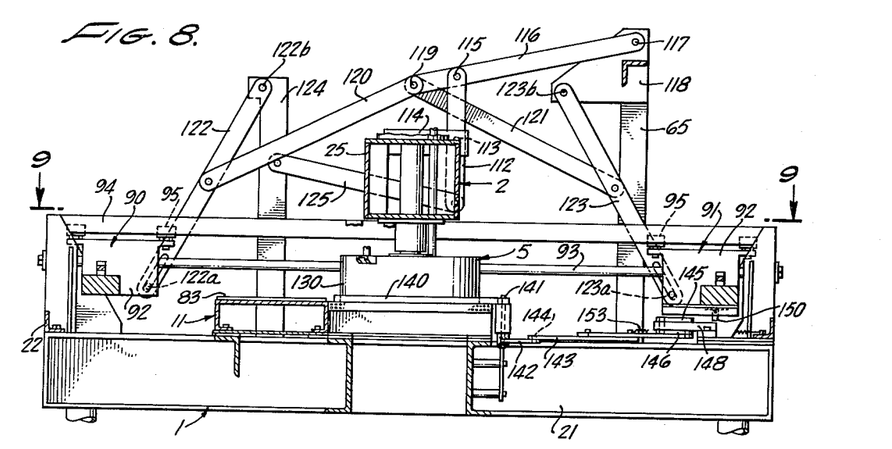
FIG. 8 is a fragmentary sectional view taken on the line 8—8 of FIG. 2.

The beam 2 consists of an elongate box-like body, see FIG. 2, disposed transversely of the frame 1 and which as best shown in FIGS. 6, 7 and 8, includes a horizontal top member 24 and vertical side flanges 25 depending from the top member 24. As shown in FIG. 2 the beam 2 has a wide central portion that is open on its under side, a shown in FIG. 6, to provide for connection thereto of the piston cylinder unit 6. As shown in FIG. 6, the piston rod 26 depending from the piston 27 of the piston cylinder unit 6 is secured to plate or bar 28 in turn welded to and between a pair of cross members 29 on the frame 1 whereas the cylinder 30 of unit 6 is fixed at its upper end to the beam 2. A head 31 on the upper end of cylinder 30 abuts the underside of the top member 24 of the beam 2 and is fastened thereto by separate bolts 32.

The head 31 and member 34 at opposite ends of the piston are provided with ports 31a and 34a for connection with flexible hose lines 36 and 37, which as here shown provide for directing compressed air from a suitable source not shown to the cylinder 30 for raising and lowering the cylinder 30 and the beam 2.

As here shown, a solenoid and an air-controlled four-way valve 38 mounted on the frame 1 and connected to the hose lines 36 and 37 may be employed to control flow of air to raise and lower the cylinder 30 and beam 2. The valve 38 is part of the means for controlling the movement of the beam and the construction and arrangement of this valve and other elements of the control means as well as operation thereof will be hereinafter fully described.

Figure 9:
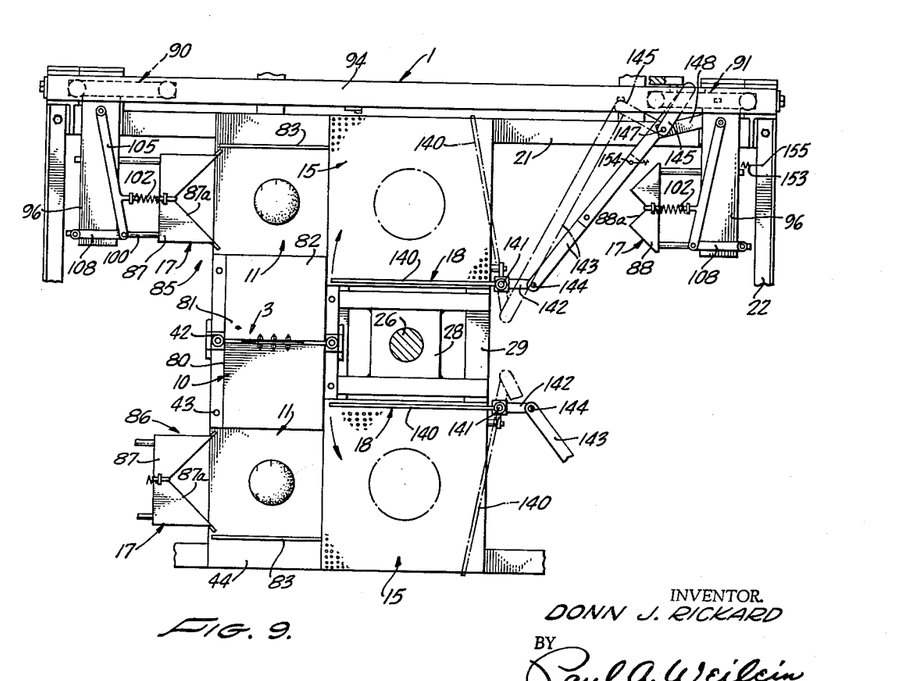
FIG. 9 is a fragmentary sectional view taken on the line 9—9 of FIG. 8.

The fruit holding means 7 forming a part of the bisecting means 3 includes a pair of fruit holding members 40 of such shape that when brought close to one another with the knife means 8 therebetween, they will cooperatively form a pocket substantially in the shape of an inverted pyramid for supporting a whole piece of fruit in centered relation to and in contact with the knife means. The pocket thus formed has a wide open upper end and tapers downwardly so as to accommodate fruit over a wide range of sizes and shapes. Each of the members 40 therefore, is substantially in the form one half of an inverted pyramid dividend axially and the knife means 8 includes a main blade 8a having a substantially V-shaped cutting edge 8b formed with a radius at the bottom of the V thereof. This cutting edge is exposed between the members 40 when the latter are brought close to opposite sides of the blade 8a so that any piece of whole fruit regardless of size that is capable of entering the upper end of the "pocket" formed by the member 40, will be centered with respect to the main blade 8a and disposed in contact with the cutting edge 8b. With this arrangement citrus fruit over a large range of sizes will be held between the members 40 in position to be bisected. Rind edge slitting knives 8c are arranged in a group so as to be fixed to the blade 8a just below the lowermost point of the cutting edge 8b, whereby as the fruit is being bisected the knives 8c will provide a plurality of slits in the edges of the rinds of each half to facilitate extraction of juice in flattening the halves. As here shown, the main blade 8a is held by and between a pair of slotted supporting members 42 fixed to guide means 10 with end edges of the blade in the slots of the members 42 and the bottom edge on the guide means 10. As shown in FIG. 6, the guide means 10 is secured by fastening 43 to a frame member 44 which provides as shown in FIG. 9, the bisected fruit supporting platforms 11 on opposite sides of the guide means.

Figure 1:
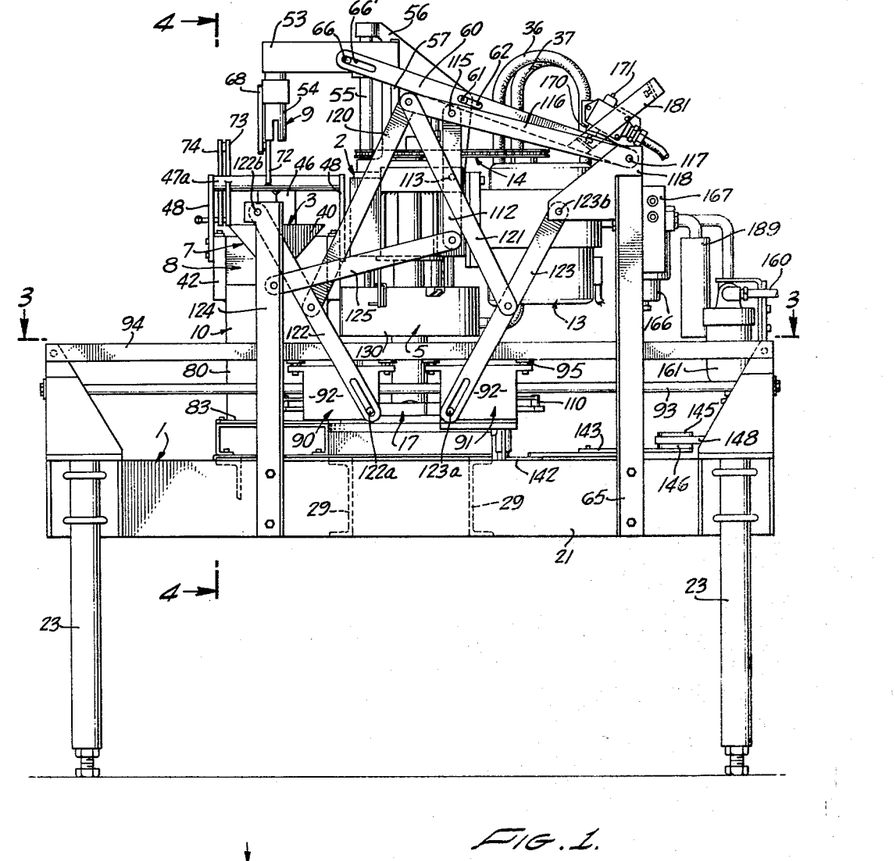
FIG. 1 is a side elevation of juice extracting apparatus embodying the present invention.

The fruit holding members 40 are supported by feed chutes 46 secured at their lower end to the upper sides of the members 40 and extended therefrom to shafts 47 and 47a horizontally and rotatably mounted at their ends in pairs of supporting arms 48 fixed as shown in FIGS. 1 and 2 to the knife supporting members 42 and extending upwardly and outwardly therefrom. Fruit deposited in either feed chute from suitable feed means not shown will roll down thereon so as to be received and held between the members 40 when the latter are in fruit-holding position. In this connection it should be noted with reference to FIG. 4 that upon rotary movement of the shafts 47 and 47a the chutes 46 will swing the fruit holding members 40 from fruit holding position to the position for releasing bisected fruit as shown in FIG. 7. This rotary movement of these shafts is effected in response to movement of the beam 2 from its up position to its down position in a manner which will be hereinafter described.

Return of the members 40 to fruit holding position is effected by a retractable spring 50 operatively connected to the shafts 47 and 47a, the spring resisting movement of the members 40 into releasing position and being operative to return the member 40 to holding position during upward movement of the beam 2.

The plunger means 9 forming a part of the bisecting means 3 includes an arm 53 for supporting a plunger or ram 54. This arm has one end portion slidable vertically on a guide rod 55 fixed at its lower end to the top of the beam 2, as shown in FIG. 2. The upper end of the guide rod 55 is fixed to the upper end of an upstanding bracket plate 56 mounted on the upper side of the beam 2. The inner end of the arm 53 is bifurcated and straddles the adjacent edge of the plate 56, as shown in FIG. 1, with the furcations of the arm slidably engaged with ribs 57 on opposite sides of the plate to hold the arm against angular movement about the axis of the guide rod 55. The plunger or ram 54 is fixed to and depends from the outer end of the arm 53 for movement with the arm so as to engage whole fruit in the holding members 40 to force the fruit against the main blade 8a and the rind-slitting knives 8c. The lower or fruit-contacting end of the ram 54 is slotted as at 54a to accommodate the curved portion of the blade 8a and is slotted as at 54b to receive one of the slitting knives 8c when forcing the fruit so as to bisect it. As the arm 53 and ram 54 are carried by the beam 2 and move therewith as well as relative thereto it is seen that the ram is mounted to have a longer stroke than the beam whereby the ram will function to push fruit over a wide range of sizes down against the knife blades 8a and 8c in response to a comparatively small amount of movement of the beam and thereby bisect the fruit.

Means are provided for mechanically operating the ram 54 and the fruit holding members 40 responsive to movement of the beam 2 relative to the frame 1. This means, as shown in FIGS. 1 and 6, includes a lever 60 pivotally connected between its ends to the bracket plate 56 on the beam 2 by means of a pin 61 on the plate and a slot 62 in the lever. One end of the lever 60 is pivoted as at 63 on a horizontal frame member 64 supported above the main frame by posts 65, while the other end of the lever is pivotally connected to the supporting arm 53 for the ram 54 by means of a pin 66 on the ram and a slot 66' in the lever. With this arrangement the lever 60 is rocked about its pivotal connection with the plate 55 on the beam 2 in response to movement of the beam and in being so rocked will move the arm 53 and ram 54 relative to the beam.

Figure 4:
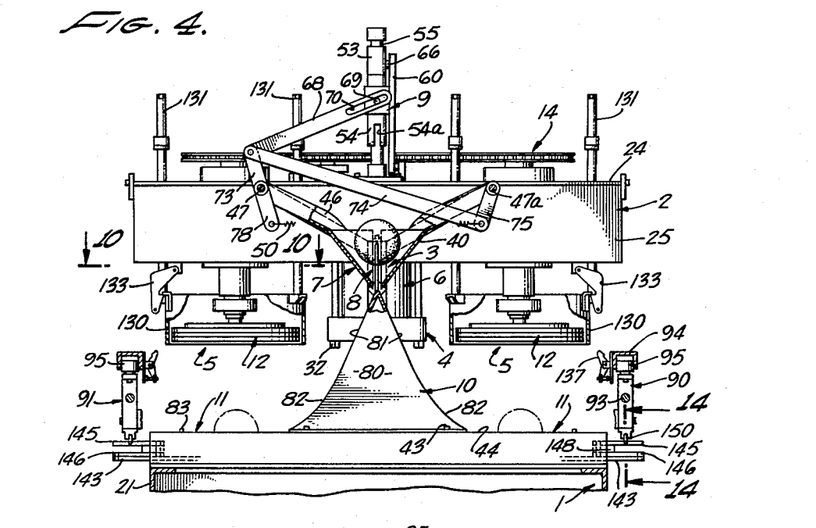
FIG. 4 is a fragmentary vertical sectional view taken on the plane of line 4—4 of FIG. 1, with parts broken away for clarity of illustration.

As a means for moving the fruit holding members 40 into and from fruit holding position the ram 54 as shown in FIGS. 4 and 7, is pivoted to one end of a link 68 by means of pin 69 on the ram and a slot 70 in the link. The link 68 at its other end is pivoted as at 71 to a crank arm 72 on the shaft 47 for turning that shaft in response to movement of the ram 54. In order that this turning of the shaft 47 will at the same time effect turning of the shaft 47a for moving both shafts and the fruit supporting members 40 connected to the shafts by the chutes 46, to provide for simultaneous movement of the members 40 into position to release bisected fruit, another crank arm 73 is provided on the shaft 47 and connected by means of a link 74 to a crank arm 75 on the shaft 47a.

When the beam 2 is in its lowermost or down position as shown in FIGS. 6, 7 and 8, the fruit holding members 40 are in spread apart position as shown in FIG. 7, to release bisected fruit, while the ram 54 is also in its lowermost position and the rotative pressure applying members 12 are operable to express juice from previously bisected fruit disposed thereberneath on the grids 15. As hereinbefore noted, the control means to be hereinafter described maintains the beam 2 in this down position for a predetermined dwell period during which a thorough juice extracting action is effected by the rotary members 12 and the grids 15 to express the maximum amount of juice from two fruit halves subjected to such treatment. However, at the end of this dwell period, the control means causes operation of the piston and cylinder means 6 for moving the beam 2 upwardly and as the beam starts upward the spring 50 exerts a force through the crank arms 73 and 75 to cause the shafts 47 and 47a to rotate and move the members 40 back into the fruit holding position shown in FIG. 4. The pin and slot (69–70) connection of the link 68 with the ram 54 makes it possible for the spring 50 to effect the movement of member 40 into fruit holding position. This pin and slot connection also constitutes a means for effecting a quick and forceful movement of the members 40 into position for releasing the bisected fruit, since in the down movement of the plunger or ram 54, when the pin 69 encounters the end of slot 70, lost motion between the member 54 and the link 68 ceases and a quick and positive movement of the link is effected so that through the connection thereof with the shafts 47 and 47a, the shafts will respond and quickly retract the member 40 into releasing position.

Figure 10:
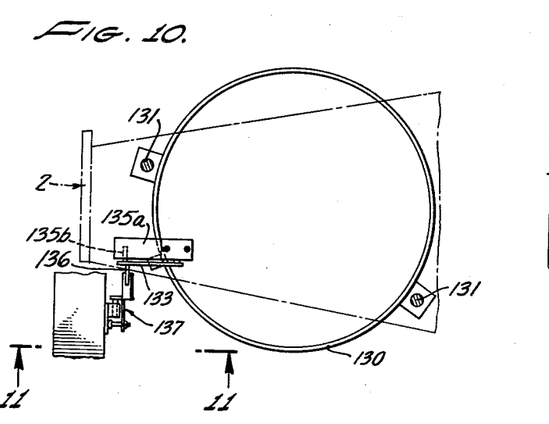
FIG. 10 is an enlarged fragmentary sectional view taken on the line 10—10 of FIG. 4.

Referring now to the guide means 10 which assures that the fruit halves release from the bisecting means 3 will slide downwardly onto the platform 11 without tumbling and so to come to rest on the platforms with the rind sides uppermost, it will be seen that this means constitutes an inverted V-shaped member 80 fixed in upright position on the frame member 44. On opposite sides of the member 80 are inclined guide surfaces 81 which diverge from on top of the member 80 with an angle of inclination such that the bisected fruit will slide downwardly thereon without rolling or tumbling with the cut faces on the surfaces 81. The surfaces 81 extend for the major portion of the height of the member 80 and are contiguous with curved surface portions 82 which direct the fruit halves laterally therefrom onto the platforms 11. Means are provided to arrest the fruit halves sliding off the guide member 10 so that the halves will remain on the platforms 11 and as here shown, the means includes upstanding stop ribs or like members 83 along the outer edges of the platforms opposite the curved surface portion 82. It has been found that if the surfaces 81 are so disposed that the angle of inclination from the vertical is not less than 23 degrees, the bisected fruit will slide freely down such surfaces without tumbling, it being understood that this angle may vary providing the inclination of the surfaces 81 is such that the fruit halves will slide freely down onto the platforms with the rind sides uppermost.

Figure 3:
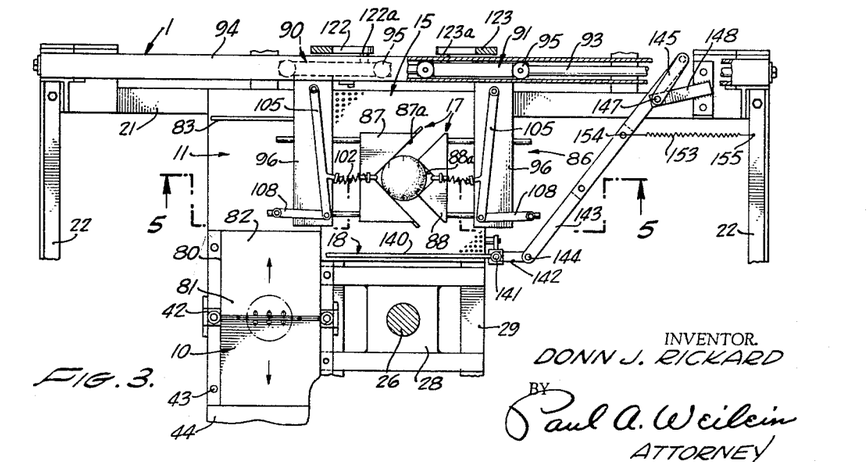
FIG. 3 is a fragmentary horizontal sectional view taken on the plane of line 3—3 of FIG. 1.

The fruit half positioning means 17 for moving the halves from the platforms 11 onto the grids 15 as shown in FIGS. 3 and 9, is constructed and operated to assure that each fruit half moved onto grids 15 will be centered with the axis of the rotary pressure members 12, regardless of the size of the halves. The positioning means 17 comprises identical units 85 and 86 each operable for positioning one half of each bisected whole fruit, the two units being operated simultaneously in response to movement of the beam 2 and consequent operation of the operating means which mechanically connects the beam with the units 85 and 96 in a manner to be hereinafter described. Each of the positioning units 85 and 86 includes a pair of fruit half engaging members 87 and 88 movable over the associated platform 11 and grid 15 and which form V-shaped fruit half receiving recesses 87a and 88a. The walls of the members 87 and 88 which define the recesses therein are of such height as to effectively embrace a large area of the rind sides of the halved fruit to insure a proper positioning of the fruit halves. The recess 87a is wider and deeper than the recess 88a, since the member 87 operates to move fruit halves from the adjacent platform 11 onto the associated grid 15 and the halves after release from the bisecting means come to rest in various locations on the platform before being engaged and moved by the member 87. The wide and deep recesses 87a assures that each fruit half regardless of its position of rest on the associated platform 11 will be contacted by the member 87 and engaged in the recess 87a and centered therein as the member 87 moves to position the fruit half on the grid. The member 88 operates to prevent the fruit half being moved by the member 87 from over-running the grid and therefore acts as a stop and also cooperates with the member 81 to center the fruit half so that regardless of size of the half it will be disposed in alignment or substantially in alignment with the axis of the associated rotary pressure member 12.

This centering of the fruit halves is essential as it will be apparent that if the fruit halves are out of line with the axis of the rotary pressure members they will be moved orbitally around that axis by the pressure member and thereby subjected to an undesirable grinding and abrading action by the grids 15, rather than subjected to rotative pressure in a manner which will release the maximum amount of juice with the minimum amount of rind and fruit particles other than juice. Grinding and abrading of the fruit halves will provide a greater amount of small particles to which juice will cling and be carried away when the residual matter of the fruit is removed from the grids, and for this reason the centering of the fruit beneath the members 12 provides a more effective extraction action and assures that a greater amount of juice available per half will be obtained.

Operation of the fruit positioning and centering members 87 and 88 is effected by like carriages 90 and 91 on the frame 1 arranged to support the members 87 and 88 and to move them between the retracted position shown in FIG. 9 in which the members 87 and 88 are clear of the associated platform 11 and grid 15, and the position shown in FIG. 3, in which the members 87 and 88 cooperate to center the fruit half for the purpose above noted.

Figures 5, 14:
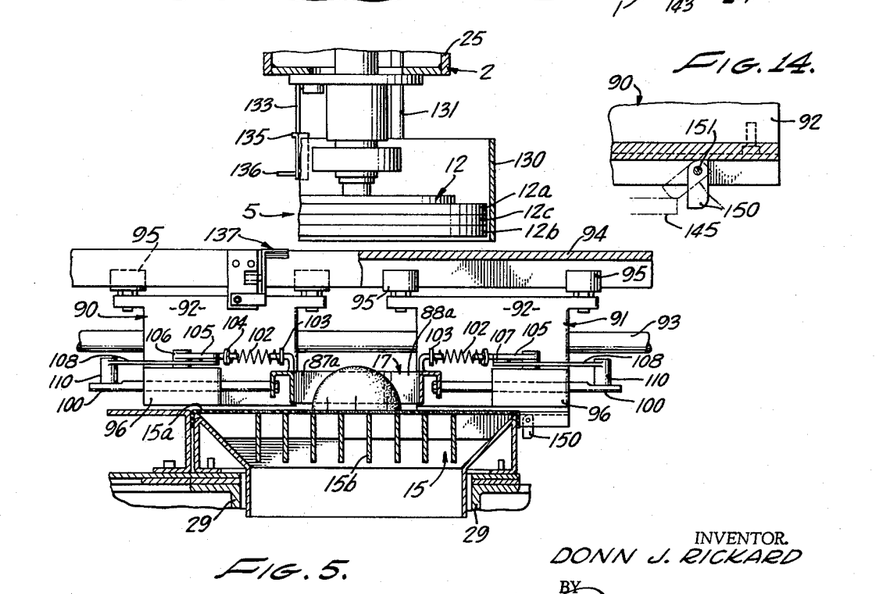
FIG. 5 is an enlarged fragmentary sectional view taken on the line 5—5 of FIG. 3.
FIG. 14 is an enlarged fragmentary sectional view taken on the line 14—15 of FIG. 4.

Each of the carriages 90 and 91 as shown in FIGS. 3 and 5 includes a substantially flat block-like body 92 slidably mounted on a guide rod 93 extending longitudinally on the frame 1, the ends of the rod being suitably fastened to corners of the frame 1. The body 92 is guided by a channelled track 94 extending lengthwise of and fastened to the frame above the rod 93, there being rollers 95 on the body 92 confined in the channel of the track so as to roll on opposite side walls of the track. Each body 92 has an arm 96 fixed thereto so as to extend laterally therefrom for movement over and close to the surfaces of the associated platform 11 and grid 15. With this arrangement the two arms 96 on the carriages 90 and 91 of each of the two fruit half positioning units 85 and 86, serve as supports for the fruit engaging members 87 and 88, which latter are slidably and yieldably mounted on these arms. Accordingly, the fruit half engaging members 87 and 88 are provided with guide rods 100 fixed thereto and slidably supported in and extending through suitable openings in the laterally extended arms 96 on the carriages 90 and 91, there also being like spring means on the members 87 and 88 operable as hereinafter described to yieldably resist sliding movement of the members 87 and 88 when these members cooperate to center the fruit half on the grid 15. As shown in FIGS. 3 and 5, the spring means which resists sliding movement of the members 87 and 88 include coiled compression type springs 102 confined between keeper elements 103 fixed on the members 87 and 88 and keeper elements 104 fixed to links 105 carried by the arms 96. The links 105 are pivoted as at 106 on the arms 96 and pivoted as at 107 to short links 108 which latter are pivotally connected to upstanding members 110 fixed to the free end portions of slidable guide rods 100 for the members 87 and 78.

The springs 102 and the link arrangement associated therewith are operable to urge the members 87 and 88 into proper extended positions relative to the arms 96 of the carriages 90 and 91 and to permit the members 87 and 88 to yield alike when encountering opposite sides of a fruit half, this yielding making is possible to position fruit halves of different sizes as the width across the cut faces thereof, in alignment or substantially in alignment with the axis of the rotary pressure applying members 12. In this connection it should be noted that fruit half positioning means moves a pair of fruit halves rapidly onto the grids 15 and that the members 88 serve as stops to prevent the fruit halves from being pushed from the members 87 or moved past the mid portions of the grids. The members 88 move toward the members 87 so as to contact the fruit about the time the fruit is centered or nearly centered beneath the pressure applying members 12, and the movement of members 87 and 88 as affected by the carriages 90 and 91 is such that both members will contact the fruit halves before the members 87 and 88 reach the limit of movement toward one another. Accordingly, the members 87 and 88 will yield while the arms 96 on the carriages move closer to one another and this yielding is controlled by the springs 102 and the links associated therewith to cause the fruit halves to be aligned or substantially aligned with axes of the rotary pressure applying members 12 so that an efficient juice extraction treatment will take place when the fruit halves are contacted by the members 12. The links 105 and links 108 which latter are carried by guide rods 100, cooperate to regulate the force of the springs 102 when the members 87 and 88 yield and slide relative to the arms 96 against the force of the springs. As the members 87 and 88 yield and move away from one another upon contacting opposite sides of the fruit halves before the carriages 90 and 91 have reached the limits of their movement toward one another, the guide rods 100 mounting links 108 move relative to the arms 96 and thereby reduce the force of the springs in proportion to the movement of the members 87 and 88 away from one another and in this manner the springs 102 are equalized as to force according to relative movement of the arms 96 and members 87 and 88.

In carriages 90 and 91 of each of the positioning units 85 and 86 are operated by system of levers and links connecting the frame 1, beam 2 and carriages shown in FIGS. 1, 2 and 8. As each end of the beam 2 an upright drive link 112 is pivoted as at 113 between its ends to a plate 114 fixed to the beam, the upper end of this link being pivoted as at 115 to a lever 116 fulcrumed at one end as at 117 on upright member 118 of the frame 1. The lever 116 is pivotally connected as at 119 to the upper ends of a pair of links 120 and 121 which are connected to levers 122 and 123 having as shown in FIGS. 1 and 2, pin and slot connections 122a and 123a at their lower ends, with the bodies 92 of the carriages 90 and 91. The levers 122 and 123 are fulcrumed at their upper ends as at 122b and 123b to upright members 124 and 118 respectively of the frame 1. Links 116, 112, 125 limit the beam 2 to vertical movement. The lower end of each drive link 112 is connected to the frame member 124 by means of a link 125. With this arrangement of the above noted links and lever at opposite ends of the beam 2 and connected with the frame 1 and carriages 90 and 91, it will be apparent that when the beam 2 is moved relative to the frame 1 the drive links 112 will rock the levers 116 so that through the links 120 and 121 the carriage operating levers 122 and 123 will be moved to likewise move the carriages and the fruit positioning members 87 and 88 into and from position for centering the fruit halves on the grids 15. In this connection it should be noted at this point that the drive means (links and levers above described) operate to move the carriages 90 and 91 so that the fruit half positioning members 87 and 88 supported by the carriages will center the fruit halves on the grids 15 during upward movement of the beam 2 relative to the frame, the carriages 90 and 91 and members 87 and 88 being retracted when the beam 2 moved downwardly.

Referring to the rotary pressure applying members 12 which press the fruit halves against the grids 15 to express juice therefrom, it will be seen with reference to FIGS. 1 and 4, that the members 12 are circular and mounted on the lower ends of shafts 127 and 128 suitably journalled on the beam 2. The upper ends of these shafts are driven by the chain and sprocket drive means 14 operated by the motor 13 fixed on the beam, as shown in FIG. 1. As here shown, each of the circular members 12 may be in the form of two metal plates 12a and 12b having a cushioning layer 12c of resilient rubber or like yieldable material interposed between the plate so that the members 12 apply a yieldable and cushioned juice extracting pressure for expressing juice from the bisected fruit.

In this connection it should be noted that the members 12 are arranged so that they will contact the rind sides of the fruit halves on the grids 15 before the down stroke of the members 12 thereof is completed, whereby they will exert the desired juice extracted pressure while being rotated in contact with the fruit. When the members 12 reach the end of their down stroke they will remain in rotative engagement with the fruit for a predetermined period of time, for example about three seconds, before being elevated, this being a function of control and timing means to be hereinafter described.

As a means for preventing juice from being thrown off the grid while the pressure applying members 12 are operating to express juice from the halved fruit, annular guard bands 130 are carried by the beam 2 so as to surround the members 12 and move up and down therewith. The bands 130 are supported by rods 131 slidably connected with the beam. Latch means are provided for releasably connecting the bands with the beam 2 so that upon release of the bands they will gravitate onto the grids 15 in surrounding relation to the fruit halves before the members 12 contact the fruit halves. This release means also functions to reconnect the bands 130 with the beam 2, when the members 12 move into lowermost position so that the bands will be elevated when the beam is moved upwardly.

Figure 11:
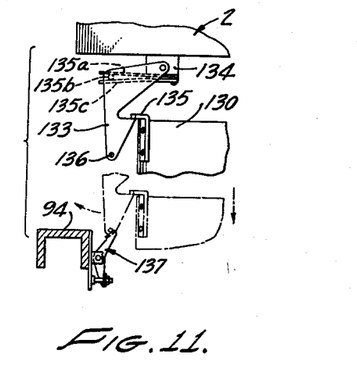
FIG. 11 is a fragmentary sectional view taken on the plane of line 11—11 of FIG. 10 and showing the latch means in different positions.
Figure 12:
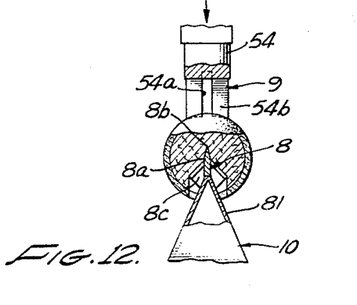
FIG. 12 is a fragmentary elevational view partly in section of fruit bisecting means, as it would appear during the operation of bisecting and slitting the rind edges of an orange.

As shown, FIGS. 10 and 11, the latch means for each band 130 includes a latch member 133 pivoted on a lug 134 on the lower side of the beam 2 and arranged to swing into and out of latched engagement with a fixed latch member 135 on the band 130. A leaf spring 135a fixed on the lug 134 engages a pin 135b on the latch member 133 so as to bias the latter into latching position. The pin 135b rests on a supporting arm 135c fixed to the lug 134 beneath the leaf spring 135a. When the latch member is swung out of latching position, the pin 135b flexes spring 135a which then urges the latch member back into latching position. The pivoted latch member 133 is provided with a trip pin 136 extending laterally therefrom. An adjustable trip member 137 is pivoted on the adjacent track 94 so as to contact and move the pivoted latch member 133 out of engagement with the fixed latch member 135 on the band 130 just before the associated member 12 is lowered into contact with the halved fruit on the grid 15, thereby assuring that the band 130 will be disposed in operative position before the juice extracting operation is started. The trip pin 136 on the pivoted latch member 133 moves below the trip member 137 as the beam 2 completes its downward movement and the pivoted latch member 133 then is forced by spring 135a inwardly into latched engagement with the fixed latch member 135 on the band 130 so that the band will be lifted with the beam when the latter is moved upwardly. As the beam 2 moves upwardly the pin 136 contacts the trip member 137 which then swings inwardly clear of the latch member 133, the pin then camming past the member 137.

The means 18 for sweeping residual fruit parts from the grids 15 following each juice extracting operation, as shown in FIGS. 3 and 9, includes a pair of arms 140 each pivoted as at 141 on the frame 1 for movement across the associated grid 15. The two arms 140 operate incident in the initial upward movement of the beam 2 and are immediately returned to out of the way position by means actuated in response to movement of the carriages 90 and 91. Accordingly, the means for operating each sweep-off arm 140 includes a crank arm 142 connected thereto through the pivot means 141 for swinging the arm about its pivot. A link 143 is pivoted at one end as at 144 to the crank arm 142 and at its other end is pivotally connected to a pair of links 145 and 146 arranged one above the other and pivoted as at 147 to a stationary arm 148 fixed to the frame near one of the carriages 90 and 91. Each of the carriages 90 and 91 has, as shown in FIG. 8, an actuating lug 150 pivoted thereto as at 151 and depending therefrom so that it will swing freely in one direction and be held against swinging movement in the other direction, this being provided for by rounding the end of the lug on one side of the pivot and providing a square shoulder on the other side of the pivot. With this arrangement, as the carriages 90 and 91 are moved from the retracted position shown in FIGS. 8 and 9, the actuating lugs 150 thereon will engage the upper links 145 and move the links 145 and 146 from the full line position shown in FIG. 9 to the dot-dash line position, thereby through the links 143 and crank arms 142 causing the armbs 140 to sweep over the grids. When the lugs 150 cam past the links 145 with continued movement of the carriages 90 and 91, springs 153 connected as at 154 to the links 143 as at 155 on the frame 1 operate to return the arms 140 to out of the way or retracted position.

Figure 13:
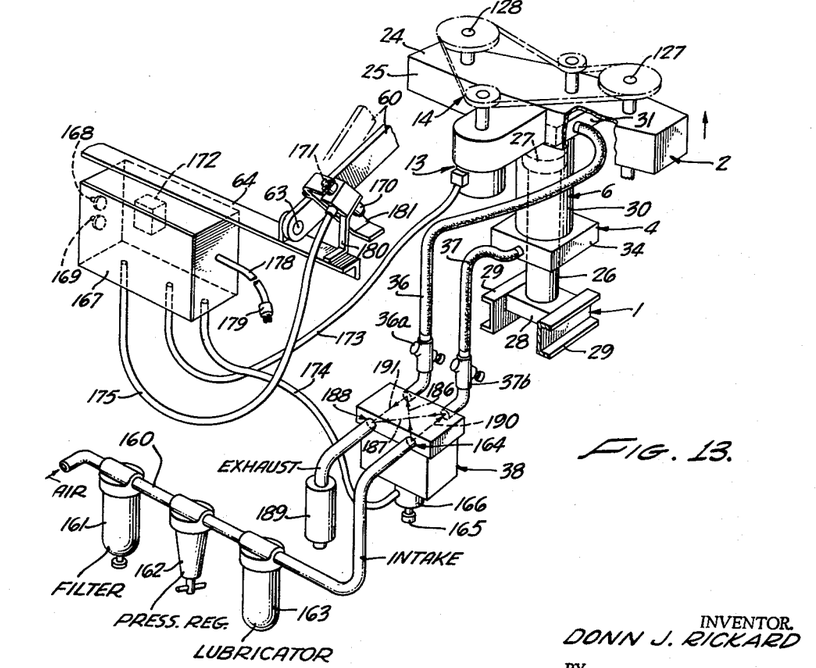
FIG. 13 is a schematic perspective view of the electrical and fluid circuits and associated parts for actuating and controlling the juice extracting apparatus hereof.

With reference to FIG. 13 it will be seen that a compressed air supply line 160 leading from a source of compressed air not shown, passes the air through a filter 161, pressure regulator 162 and lubricator 163 in the order named, thence to the inlet 164 of the solenoid and compressed air operated 4-way valve 38. This valve is provided with a manually operable "override" control element 165 which when manipulated will actuate the valve in the same manner as when the solenoid unit 166 is energized. As this valve unit is conventional and well known it is believed that it will not be necessary to disclose the internal structure and workings thereof; and that the present disclosure of the valve and the following description will make it clear as to how the valve controls flow of air for reciprocating the beam 2.

An electrical control box 167 is mounted on the frame 1 as shown in FIGS. 1, 2 and 13, and contains a master switch, not shown, for controlling an electrical circuit for the solenoid unit 166 as well as an electrical circuit for the motor 13 for driving the rotary juice extracting members 12. This master switch is actuated by manually operable "on" and "off" control members 168 and 169 accessible on the exterior of the box. When the "on" control member 168 is actuated to close the circuit for the motor 13 the circuit remains closed until the "off" control member 169 is actuated to open the motor circuit. The circuit for the solenoid unit 166 is closed also upon operating the "on" control member 168 and is additionally controlled by mechanically actuated switches 170 and 171 on the frame 1 and by a suitable timing switch unit 172 in the control box 167, as indicated in FIG. 13. A cable 173 as shown in FIG. 13, leading from the control box 167 to the motor 13 contains the circuit conductors for maintaining the motor 13 in operation as long as the "on" control 168 is in circuit closing position.

A cable 174 leading from the timing unit 172 in the control box 167 to the solenoid 166 and a cable 175 leading from switches 170 and 171 to the timing switch unit 172, contain the conductors required for a circuit for energizing the solenoid unit according to the operation of micro-switches 170 and 171 and the timing switch unit. This arrangement is such that when the beam 2 is moved to its up position the switch 170 is mechanically operated to open the circuit for the timer switch unit 172 and the solenoid 166 whereas when the beam 2 reaches its down position the switch 171 is mechanically operated to close the circuit for the timer switch unit 172 which latter after a predetermined time delay for example, 3 or 4 seconds, closes the solenoid circuit so that the valve 38 will be operable to direct air into the piston and cylinder unit 6 for moving the beam 2 upwardly. As shown in FIG. 13, the electrical apparatus may be coupled through the control box 167, to a suitable source of electrical current by means of the conductor 178 and the conventional plug 179 thereon.

The micro-switches 170 and 171 are mounted on a bracket 180 fixed to the frame member 64 as shown in FIGS. 2 and 13, and a C-shaped actuator 181 is fixed on the lever 60 so as to operate the switches 170 and 171 when the lever is moved into the positions it occupies when the beam 2 is in its up and down position. On the up position of the beam 2 the actuator 81 operates the "off" switch 170 to open the circuit for the timer switch 172 and solenoid unit, whereas when the beam reaches the down position the actutor operates the "on" switch 171 to close the circuit for the timer switch and solenoid units.

The four-way valve 38 as schematically shown in FIG. 13 is of a well known type in which air pressure operated valve members are controlled by solenoid operated valve means. When the solenoid is energized the beam 2, then being in the down position, the valve 38 operates to direct compressed air therethrough to the hose line 36 leading to the top of the cylinder 30 for raising the cylinder and moving the beam 2 to its up position. The passage in the valve for so conducting the compressed air is indicated by the dashed line 186 and the return flow of air from the bottom of the cylinder passes through the hose line 37 and a passage in the valve indicated by the dashed line 187 which latter leads to the exhaust port 188 of the valve. A suitable muffler 189 may be connected as here shown to the exhaust port.

When the solenoid is deenergized as when the beam reaches its up position, the valve 38 is air pressure operated to conduct fluid from the intake port 164 through a passage indicated by the dashed line 190 to the hose line 37 leading to the bottom of the cylinder 30 so that the cylinder and the beam 2 will be moved to down position. The return flow of air from the top of the cylinder passes through hose line 36 and passage in the valve indicated by the dashed line 191 to the exhaust port 158. Valves 36a and 37b in the lines 36 and 37 are manually operable for regulating flow of air from the cylinder 30 to provide for the desired rate of up and down movement of the beam 2.

As hereinbefore noted the manual override control 165 provides for operation of the valve 38 in the same manner as when the solenoid 166 is energized and may be operated for testing the operation of the apparatus or for any other purpose where movements of the beam 2 and associated elements are desired independent of energization of the solenoid.

The beam 2 normally is in the down position as is also the cylinder 30 and in connecting the valve 38 to the air supply line 160, the master switch control 169 then being in position for opening the electrical circuits, the valve 38 will function to direct air through the line 37 to the bottom of the cylinder 30 and therefore hold the cylinder down. At this time the micro switch 171 is in position closing the circuit for the timer switch 172, but as the master switch as controlled by the "off" actuator 169 is in position opening all circuits of the apparatus, no movement of the cylinder 30 and beam 2 will take place. Upon actuating the "on" control 168 for the master switch the circuit for the timer switch 172 is closed, and after a predetermined delay of for example, 3 or 4 seconds, the solenoid becomes energized and causes the valve 38 to direct air through passage 186 and line 36 to the cylinder 30 for raising the cylinder and beam 2 to their up position.

Upon reaching the up position the micro switch 170 is actuated by the member 181 to open the circuit for the timer switch 172 and the solenoid is deenergized so that the valve 38 is then air pressure actuated to direct air through passage 190 and hose line 37 to the bottom of the cylinder for moving the cylinder and beam downwardly.

When the beam 2 reaches the down position the switch 171 is closed and the solenoid 166 is energized after the momentary delay effected by the timer switch 172, thereby operating the valve 38 to direct air for again raising the cylinder 30 and beam 2. This cyclical operation continues as long as the master switch "on" control 168 is in the "on" position, there being a time delay in the movement of the beam only when the beam 2 reaches its down position.

As the mode of operation of each unit of the extractor has been described in connection with the description of the construction of each unit, a résumé of the operation of the extractor will follow.

Assuming that the master switch "on" control has been moved to the position to close the electrical circuit for the motor 13 and the timer switch 172, while he beam 2 is in its normal down position in which the micro switch 171 is in circuit closing position, the beam after the time delay effected by the timer switch 172 starts upward movement responsive to energization of the solenoid and during this upward movement the ram 54 is raised and the spring 50 forces the two fruit holding members 40 into fruit holding position. At this time the first piece of whole fruit may be deposited onto one of the chutes 46 so as to roll down between the members 40 in position to be bisected by the knife 8a when the elevated ram 54 is moved down to force the fruit against the knife. When the beam reaches its up position, the micro switch 170 (see FIG. 13) is operated to open the circuit for the timer switch 172 and the solenoid 166 becomes deenergized whereupon the valve 38 operates to direct air to the piston cylinder 30 for forcing the beam 2 downwardly. As the beam 2 moves downwardly the ram 54 engages the fruit and forces it against the knife 8a and slitting knives 8c so that the fruit will be bisected with the rind edges of each half formed with a number of slits as the halves move past the knives 8c. As the ram 54 nears the end of its downward movement, the fruit will have been bisected and when the pin 69 (see FIG. 4) reaches the end of the slot 70 in the link 68, the latter is moved with a quick action, thereby through the crank arm 72, shaft 47, crank arm 75, link 74 and crank arm 75 on the shaft 47, causing the chutes 46 to swing the members 40 apart with a quick action to release the fruit halves.

The two fruit halves will slide downward on the inclined surfaces 81 of the guide member 10, with the rind sides uppermost and then be directed by the curved surfaces 82 onto the platforms 11.

When the beam 2 reaches its down position the valve 38 in the manner hereinbefore noted causes the beam 2 to rise after the time delay, and as the beam moves upwardly the fruit positioning members 87 and 88 are moved toward one another so that the members 87 will engage the fruit halves on the platforms 11 and move them onto the grids 15, the members 87 and 88 cooperating as hereinbefore noted to dispose the halves so that the centers thereon are aligned with the axes of the rotary pressure applying member 12. As the beam continues to move upwardly the fruit holding members 40 and the ram 54 move into position to permit of the deposit of another piece of whole fruit between the members 40.

After the second piece of fruit is disposed in position to be bisected and the beam 2 reaches its up position, the downward movement thereof is again effected and during this downward movement, the positioning members 87 and 88 are retracted before the second piece of fruit is bisected. Upon continued, downward movement of the beam 2 the fruit is bisected and the two halves released so as to gravitate onto the grids 11 while the rotary pressure members 12 contact and apply juice extracting pressure to the previously positioned halves centered on the grids 15. Since the micro-switch 171 is operated to close the circuit for timer switch 172 when the beam reaches its down position in which the rotary pressure members are effecting a juice extracting action, the timer switch delays closing the circuit for the solenoid 166 for a predetermined length of time for example 3 or 4 seconds, during which the juice extraction action of the members 12 continues. At the end of this time delay the solenoid 166 is energized and causes the up movement of the beam 2 to begin, thereby lifting the members 12 clear of the spent fruit halves on the grids. At the start of the up movement of the beam 2 the link and lever connection previously described, between the beam and the carriages 90 and 91 cause the latter to move toward one another and thereby start movement of the fruit positioning members 87 and 88. At the first part of movement of members 87 and 88, the sweep off arms 140 are caused to sweep over the grids in the manner hereinbefore described to remove the spent fruit rinds and other fruit particles from the grids. These arms being returned to normal or out of the way position by the springs 153 in the manner hereinbefore described. A third piece of fruit may now be deposited so as to be held by the members 40 which assume fruit holding position during the up movement of the beam and before the next downward movement of the beam 2.

It will now be apparent that the extractor as hereinbefore described and as shown in the accompanying drawings will operate continuously and efficiently as whole citrus fruit is fed thereto one piece at a time, to quickly and thoroughly express all of the juice from each fruit half in order that the total amount of juice obtained from a sample batch of whole fruit, for example about forty pounds of fruit, may be tested accurately to ascertain if the larger amount of fruit from which the sample was obtained contains the required amount of soluble solids to render the fruit suitable for the market.

I claim:

1. A citrus fruit juice extractor comprising: a frame member; a beam member; means connecting said members including power operated means for effecting relative movement of said members; whole fruit bisecting means cooperatively supported by members; grid means on one of said members for supporting bisected fruit in position to have juice extracting pressure applied thereto; means cooperable with said bisecting means for gravitationally disposing the bisected fruit cut faces downmost in predetermined positions with respect to said grid means; positioning means on said one member for moving the bisected fruit from said predetermined positions onto said grid means; pressure applying means on the other of said members for subjecting bisected fruit on said grid means to juice extracting pressure in response to predetermined relative movement of said members; and actuating means interconnecting said bisecting means and said positioning means with said members and operable in response to relative movement of said members for actuating said bisecting means and said positioning means.

2. A citrus fruit juice exractor comprising: a frame member; a beam member; means connecting said members including power operated means for effecting relative movement of said members; whole fruit bisecting means cooperatively supported by said members; grid means on one of said members for supporting bisected fruit in position to have juice extracting pressure applied thereto; means cooperable with said bisecting means for gravitationally disposing the bisected fruit cut faces downmost in predetermined positions with respect to said grid means; positioning means on said one member for moving the bisected fruit from said predetermined positions onto said grid means; pressure applying means on the other of said members for subjecting bisected fruit on said grid means to juice extracting pressure in response to predetermined relative movement of said members; sweep-off means on said one member for sweeping residual fruit elements from said grids; and actuating means interconnecting said bisecting means, said positioning means and said sweep-off means with said members operable in response to relative movement of said members to actuated said bisecting means, said positioning means and said sweep-off means.

3. A citrus fruit juice extractor comprising: a frame member; a beam member; means connecting said members including power operated means for effecting relative movement of said members; whole fruit bisecting means cooperatively supported by said members; grid means on one of said members for supporting bisected fruit in position to have juice extracting pressure applied thereto; means cooperable with said bisecting means for gravitationally disposing the bisected fruit cut faces downmost is predetermined positions with respect to said grid means; positioning means on said one member for moving the bisected fruit from said predetermined positions onto said grid means; pressure applying means on the other of said members for subjecting bisected fruit on said grid means to juice extracting pressure in response to predetermined relative movement of said members; means for rotating said pressure applying means; and actuating means interconnecting said bisecting means and said positioning means with said members and operable in response to relative movement of said members for actuating said bisecting means and said positioning means.

4. A citrus fruit juice extractor comprising: a frame member; a beam member; means connecting said members including power operated means for effecting relative movement of said members; whole fruit bisecting means cooperatively supported by said members; grid means on one of said members for supporting bisected fruit in position to have juice extracting pressure applied therto; positioning means on said one member for moving the bisected fruit onto said grid means; pressure applying means on the other of said members for subjecting bisected fruit on said grid means to juice extracting pressure in response to predetermined relative movement of said members; means for rotating said pressure applying means; actuating means interconnecting said bisecting means and said positioning means with said members and operable in response to relative movement of said members for actuating said bisecting means and said positioning means; and control means for said power operated means operable when said pressure applying means are disposed in said pressure applying position for maintaining said pressure applying means in said pressure applying position for a predetermined period of time and then actuating said power operated means to effect relative movement of said members that will move said pressure applying means out of said pressure applying position.

5. A citrus fruit juice extractor comprising: a frame, a movable beam; means connecting said frame and beam including power operated means for moving said beam between two positions relative to said frame; whole fruit bisecting means including cooperative elements on said frame and said beam respectively; grid means on said frame for supporting bisected fruit in position to have juice extracting pressure applied thereto; positioning means on said frame for moving bisected fruit onto said grid means; rotary pressure applying means on said beam for applying juice extracting pressure to the bisected fruit on said grid means when said beam is in one of said positions; means on said beam for rotating said pressure applying means; and actuating means mechanically connecting said beam and frame with the bisecting elements on said beam and with said positioning means on said frame operable in response to movement of said beam for actuating said bisecting means to bisect whole fruit and actuating said positioning means to dispose the bisected fruit on said grid means.

6. A citrus fruit juice extractor comprising: a frame, a movable beam; means connecting said frame and beam including power operated means for moving said beam between two positions relative to said frame; whole fruit bisecting means including cooperative elements on said frame and said beam respectively; grid means on said frame for supporting bisected fruit in position to have juice extracting pressure applied thereto; positioning means on said frame for moving bisected fruit onto said grid means; rotary pressure applying means on said beam for applying juice extracting pressure to the bisected fruit on said grid means when said beam is in one of said positions; means on said beam for rotating said pressure applying means; actuating means mechanically connecting said beam and frame with the bisecting elements on said beam and said positioning means on said frame operable in response to movement of said beam for actuating said bisecting means to bisect whole fruit, actuating said positioning means to dispose the bisected fruit on said grid means; and control means for said power operated means operable when said beam is moved into said one of said positions to operate said power operated means so as to move said beam into the other of said positions.

7. A citrus fruit juice extractor comprising: a frame, a movable beam; means connecting said frame and beam including power operated means for moving said beam between two positions relative to said frame; whole fruit bisecting means including coopreative elements on said frame and said frame and said beam respectively; grid means on said frame for supporting bisected fruit in position to have juice extracting pressure applied thereto; positioning means on said frame for moving bisected fruit onto said grid means; rotary pressure applying means on said beam for applying juice extracting pressure to the bisected fruit on said grid means when said beam is in one of said positions; means on said beam for rotating said pressure applying means; and actuating means mechanically connecting said beam and frame with the bisecting elements on said beam and said positioning means on said frame operable in response to movement of said beam for actuating said bisecting means to bisect whole fruit, and actuating said positioning means to dispose the bisected fruit on said grid means; and control means for said power operated means operable when said beam is moved into said one of said positions to operate said power operated means so as to move said beam into the other of said positions; said control means including timing means for maintaining said beam in said one position for a predetermined period of time before actuating said power operated means to move said beam into said other position.

8. In a citrus fruit juice extractor; a frame, a movable beam; means connecting said frame and beam including power operated means for moving said beam between two positions relative to said frame; whole fruit bisecting means including cooperative elements on said frame and said beam respectively; juice extracting means including elements on said frame and said beam respectively cooperable to express juice from the bisected fruit upon movement of said beam into one of said positions; said elements of said bisecting means on said frame including knife means; said elements of said bisecting means on said beam including whole fruit holding means and plunger means; means mounting said holding means for movement between a position supporting a whole piece of fruit adjacent said knife means and a position for releasing fruit bisected by said knife means for movement into position to have juice extracted therefrom; said plunger means being operable for engaging and forcing fruit in said holding means against said knife means to bisect the fruit; means mounting said plunger means on said beam for movement relative to said beam into and from position for moving said fruit against said knife means to bisect the fruit; and operating means mechanically connecting said frame and said beam with said fruit holding means and said plunger means on said beam operable during movement of said beam relative to said frame for actuating said plunger means to move the fruit against the knife to bisect the fruit in said holding means and then move said holding means to said position for said releasing of the bisected fruit.

9. In a citrus fruit juice extractor; a frame, a movable beam; means connecting said frame and beam including power operated means for moving said beam between two positions relative to said frame; whole fruit bisecting means including cooperative elements on said frame and said beam respectively; said bisecting means including means operable for effecting gravitational discharge of fruit halves therefrom; guide means on said frame beneath the bisecting element on said frame; said guide means having a pair of opposed and downwardly divergent guide surfaces for guiding the halves of fruit released from the bisecting means gravitionally downwardly thereon with the cut faces against said surfaces; platforms on said frame opposite said guide surfaces; said guide means having other surfaces disposed as continuations of said guide surfaces for conducting the gravitating fruit halves therefrom onto said platforms; grid means on said frame; positioning means on said frame for moving said halves from said platforms onto said grid means; means on said beam for applying juice extracting pressure to the halves on said grid means upon movement of said beam into one of said two positions; and operating means for actuating said bisecting means and said positioning means mechanically connected thereto and to said beam and frame and operable upon movement of said beam relative to said frame.

10. In a citrus fruit juice extractor; a frame; a beam; means on the frame connected with said beam and operable to move the beam toward and away from the frame; means on the frame and beam respectively cooperable for bisecting whole fruit and releasing the bisected fruit on movement of the beam toward the frame; means on the frame for supporting fruit halves released from the bisecting means; juice extracting means on the frame and beam respectively cooperable upon movement of the beam toward the frame to extract juice from the fruit halves when each fruit half is disposed in predetermined position on the frame; positioning means on the frame operable upon movement of the beam away from said frame for moving the fruit halves from said supporting means into said predetermined position on said frame; said positioning means includes a pair of opposed fruit half engaging members movable for engagement with each fruit half; said fruit positioning means including actuating means connected to and operable for moving said fruit half engaging members a predetermined extent toward one another with each operation of said positioning means; and means connecting said fruit half engaging members with said actuating means including resilient means operable so that said fruit half engaging members when moved said predetermined extent in contact with a fruit half will yield in accordance with the diameter of the fruit half engaged thereby whereby fruit halves of different diameter will be disposed in substantially said predetermined position on the frame for having the juice extracted therefrom.

11. In a citrus fruit juice extractor, a frame; a beam; means on the frame connected with said beam and operable to move the beam toward and away from the frame; means on the frame and beam respectively cooperable for bisecting whole fruit and releasing the bisected fruit on movement of the beam toward the frame; means on the frame for supporting fruit halves released from the bisecting means; juice extracting means on the frame and beam respectively cooperable upon movement of the beam toward the frame to extract juice from the fruit halves when each fruit half is disposed in predetermined position on the frame; positioning means on the frame operable upon movement of the beam away from said frame for moving the fruit halves from said supporting means into said predetermined position on said frame; said juice extracting means including a rotary pressure applying means on the frame and grid means on said frame for supporting fruit halves in said predetermined position; means on said beam for rotating said pressure applying means; and means embodied in said fruit half positioning means for moving each fruit half onto said grid means into a position with its center substantially aligned with the axis of said rotary pressure applying means.

12. In a citrus fruit juice extractor; a frame, a beam; means connected with said frame and beam for moving the latter relative to said frame; juice extracting means including elements on said beam and said frame respectively cooperable for applying juice extracting pressure to cut sections of citrus fruit disposed in a predetermined position between said elements, means on said frame for supporting said fruit sections to one side of said elements; positioning means on said frame for moving said fruit sections from said supporting means into said predetermined position; and means operable in response to movement of said beam to actuate said positioning means and dispose said elements for applying juice extracting pressure to said fruit sections.

13. In a citrus fruit juice extractor; a frame, a beam; means connected with said frame and beam for moving the latter relative to said frame; juice extracting means including elements on said beam and said frame respectively cooperable for applying juice extracting pressure to cut sections of citrus fruit disposed in a predetermined position between said elements; means on said frame for supporting said fruit sections to one side of said elements; positioning means on said frame for moving said fruit sections from said supporting means into said predetermined positions; and means mechanically interconnecting said beam, said frame and said positioning means operable upon predetermined movement of said beam relative to said frame for actuating said positioning means; said juice extracting means being operable in response to movement of said beam into a predetermined position relative to said frame.

14. In a citrus fruit juice extractor; a frame, a beam; means connected with said frame and beam for moving the latter relative to said frame; juice extracting means including elements on said beam and said frame respectively cooperable for applying juice extracting pressure to cut sections of citrus fruit disposed in a predetermined position between said elements, means on said frame for supporting said fruit sections to one side of said elements; positioning means on said frame for moving said fruit sections from said supporting means into said predetermined positions; said positioning means including carriages movable on said frame toward and away from one another; fruit section engaging members; said carriages including means connecting said fruit section engaging members thereto for movement therewith and relative thereto including resilient means arranged to permit said fruit section engaging members to yield according to the size of the fruit section engaged thereby in the operation of said positioning means to dispose said section in said predetermined position; and means connected to said frame, beam and carriages for moving said carriages to operate said positioning means.

15. In a citrus fruit juice extractor, a frame; a beam; power operated means connecting said beam with said frame and operable for moving said beam toward and from said frame; a pair of rotary pressure applying members on said beam; means on said beam for rotating said pressure applying members; grid means on said frame for supporting citrus fruit halves in position to have juice extracting pressure applied thereto by said rotary pressure applying members upon movement of said beam toward said frame into a predetermined position; positioning means on said frame for moving fruit halves into said predetermined position on said grid means with the centers of the fruit halves substantially aligned with the axes of said rotary pressure applying members; and means mechanically interconnected with said frame, said beam and said positioning means for actuating the positioning means to move the fruit halves into said predetermined position on said grid means in response to movement of said beam in a direction away from said frame.

16. In a citrus fruit juice extractor, a frame, grid means on said frame for supporting halved citrus fruit in position to have juice extracting pressure applied thereto;

platform means on said frame to one side of said grid means for supporting fruit halves; positioning means on said frame for moving the fruit halves from said platform means into said grid means; means operatively connected with said frame for applying juice extracting pressure to said fruit halves on said grid means; said positioning means including a first pair of fruit half engaging members movable on said frame over said platform means and said grid means to dispose the fruit halves on said grid means; said positioning means also including a second pair of fruit half engaging members opposite said first pair and movable onto said grid means to engage the fruit disposed on the grid means by said first pair of members; means for moving said first pair of members and said second pair so that when the first pair disposes the fruit on said grid means, said second pair of members will engage with said fruit halves to maintain said halves at a predetermined position on said grind means; and means for retracting said first and second pairs of members from said grid means.

17. In a citrus fruit juice extractor, a frame, grid means on said frame for supporting halved citrus fruit in position to have juice extracting pressure applied thereto; platform means on said frame to one side of said grid means for supporting fruit halves; guide means on said frame and on which halved fruit is placed with the cut faces downmost operable for slidably directing the halved fruit onto said platform means; said guide means including on opposite sides downwardly divergent inclined surfaces on which the halved fruit will slidably gravitate onto said platform means; said surfaces being inclined at such an inclined angle as will maintain said halves with the cut faces on said platform means as the halves slide thereon onto said grid means; positioning means operable for moving the halved fruit from said platform means onto said grid means; and means cooperating with said frame and grid means for applying juice extracting pressure to the fruit on said grid means.

18. In a citrus fruit juice extractor: a frame; a beam thereon; means connecting said beam and frame operable for moving said beam between two positions relative to said frame; whole fruit bisecting means including a plunger element on said beam, fruit holding means on said beam and knife means on said frame; means mounting said pluger element on said beam for movement relative thereto between two positions such that the plunger means has a greater range of movement than said beam; operating means interconnecting said frame, beam and plunger means operable to effect said relative movement of said plunger means in response to movement of said beam between said two positions; said fruit holding means including a pair of opposed fruit engaging members; means mounting said members on said beam for movement between a position for holding fruit over said knife and beneath said plunger means and a position for releasing the fruit bisected by said knife means; means interconnecting said fruit engaging members with said operating means for moving said members between said two positions in response to movement of said beam between said two positions; and means operable in association with said bisecting means and said frame for disposing and bsected fruit in a position on the frame for havng juice extracted therefrom.

19. In a citrus fruit juice extractor: a frame; a beam thereon; means connecting said beam and frame operable for moving said beam between two positions relative to said frame; whole fruit bisecting means including a plunger element on said beam, fruit holding means on said beam and knife means on said frame; means mounting said plunger element on said beam for movement relative thereto between two positions such that the plunger means has a greater range of movement than said beam; operating means interconnecting said frame, beam and plunger means operable to effect said relative movement of said plunger means in response to movement of said beam between said two positions; said fruit holding means including a pair of opposed fruit engaging members; means mounting said members on said beam for movement between a position for holding fruit over said knife and beneath said plunger means and a position for releasing the fruit bisected by said knife means; means interconnecting said fruit engaging members with said operating means for moving said members between said two positions in response to movement of said beam between said two positions; and means operable in association with said bisecting means and said frame for disposing the bisected fruit in a position on the frame for having juice extracted therefrom; and means on said beam and said frame cooperable for expressing juice from said bisected fruit when the latter is in said position on said frame.

20. Apparatus for juicing halves of citrus fruit comprising: a grid for receiving a fruit half; pressure applying means cooperable with said grid to remove juice from said fruit half; means for effecting relative movement of said grid and said pressure applying means to subject a fruit half therebetween to juice extracting pressure; guide means operatively related to said grid for moving fruit halves with their cut faces downmost to a predetermined position spaced from said grid; and fruit half positioning means operable in timed relation to said relative movement of said grid and pressure applying means for moving said fruit halves from said predetermined position onto said grid.

21. Apparatus for juicing halves of citrus fruit comprising: a grid for receiving a fruit half; pressure applying means cooperable with said grid to remove juice from said fruit half; means for effecting relative movement of said grid and said pressure applying means cyclically to apply juice extracting pressure to fruit halves on said grid; means for feeding fruit halves successively with their cut faces downmost to predetermined positions spaced from said grid; and means operable in timed relation to said relative movement of said grid and pressure applying means for moving said fruit halves from said predetermined positions successively onto said grid.

22. Apparatus for juicing halves of citrus fruit comprising: a grid for receiving a fruit half; pressure applying means cooperable with said grid to remove juice from said fruit half; means for cylically effecting relative movement of said grid and said pressure applying means; means operable to gravitationally move fruit halves placed thereon with their cut faces downmost to a predetermined position spaced from said grid; means for driving said pressure applying means to cause rotation thereof; and means operable in timed relation to said means for effecting said relative movement of said grid and said pressure applying means for moving each fruit half from said predetermined position into a position between said grid and said pressure applying means.

23. Apparatus as defined in claim 22, wherein said positioning means includes means for positioning each said fruit half on the axis of rotation of said pressure applying means.

24. Apparatus for juicing halves of citrus fruit comprising: a grid for receiving a fruit half; pressure applying means cooperable with said grid to remove juice from said fruit half; means for effecting relative movement of said grid and said pressure applying means to subject a fruit half therebetween to juice extracting pressure; guide means operable upon having fruit halves placed thereon with their cut faces thereagainst to deposit each fruit half in a predetermined position spaced from said grid; fruit half positioning means operable in timed relation to said relative movement of said grid and pressure applying means for moving each said fruit half from said predetermined position onto said grid; means for removing residual matter from said grid; and means for operating said removing means in timed relation to said operation of said positioning means.

25. Apparatus for juicing halves of citrus fruit comprising: a pair of grids for receiving fruit halves; pressure applying means cooperable with said grids to remove juice from said fruit half; means for moving said grids and said pressure applying means; guide means spaced from said grids operable on placing fruit halves thereon with their cut faces thereagainst for gravitionally disposing each fruit half in a predetermined position spaced from said grids; fruit half positioning means operable in timed relation to said relative movement of said grids and pressure applying means for moving said fruit halves from said predetermined position onto said grids; and means for sweeping residual matter from said grids operable in timed relation to said relative movement of said grids and pressure applying means and preliminary to each fruit positioning operation of said positioning means.

26. In a juice extractor: a frame having grid means thereon; platform means supported by said frame in spaced relation to said grid means; a guide member on said frame having downwardly and outwardly flaring walls leading to said platform means; a knife at the top of said guide means; means operatively associated with said frame for engaging and centering whole fruit with respect to said knife; means for engaging and pushing said whole fruit downwardly over said knife to bisect the fruit whereby the fruit halves will gravitate downwardly and outwardly over said walls onto said platform means; positioning means engageable with said fruit halves on said platform means for moving said fruit halves into predetermined positions on said grid means; pressure applying means opposed to said grid means; and means for effecting relative movement of said grid means and pressure applying means to apply juice extracting pressure to said fruit halves.

27. A juice extractor as defined in claim 26, including means for removing from said grid means the spent fruit halves to which pressure has been applied, as said positioning means moves fruit halves onto said grid means.

28. A juice extractor as set forth in claim 26, wherein said means for engaging and centering whole fruit with respect to said knife includes a pair of pocket forming members, and means resiliently biasing said members toward one another for forming a pocket in which the whole fruit is centered with respect to said knife.

29. A juice extractor as set forth in claim 28, including means operable when said whole fruit has been bisected, for moving said pocket forming members apart to release the fruit halves onto said walls of said guide member.

30. A juice extractor as set forth in claim 26, wherein said positioning means includes pairs of fruit half engaging members movable relatively for gripping fruit halves therebetween on said platform means and moving said fruit halves onto said grid means.

31. A juice extractor as set forth in claim 30, wherein each of said fruit half engaging members has a yieldable fruit engaging portion, and means for moving said fruit half engaging members for gripping the halves therebetween and for releasing said fruit halves following said movement of said fruit halves onto said grid means.

32. In a citrus fruit juice extractor characterized by a frame, platform means on said frame including pressure means for subjecting sections of whole fruit to juice extracting pressure; and means for cutting and advancing cut sections of whole fruit for being subjected to said juice extracting pressure; the improvement wherein said means for cutting and advancing said fruit sections includes a guide member on said frame having downwardly and outwardly flaring walls leading to said platform means; knife means at the top of said guide member; means operatively associated with said frame for engaging and centering whole fruit with respect to said knife means; means for engaging and pushing whole fruit downwardly over said knife means to cut the fruit into sections whereby the sections will gravitate downwardly and outwardly over said walls onto said platform means; and means for operating said pressure means to subject said cut sections to juice extracting pressure.

33. In a citrus fruit juice extractor characterized by a frame, platform means on said frame including pressure means for subjecting sections of whole fruit to juice extracting pressure; and means for cutting and advancing cut sections of whole fruit for being subjected to said juice extracting pressure; the improvement wherein said means for cutting and advancing said fruit sections includes a guide member on said frame having downwardly and outwardly flaring walls leading to said platform means; knife means at the top of said guide member; means operatively associated with said frame for engaging and centering whole fruit with respect to said knife means; means for engaging and pushing whole fruit downwardly over said knife means to cut the fruit into sections whereby the sections will gravitate downwardly and outwardly over said walls onto said platform means; means for operating said pressure means to subject said cut section to juice extracting pressure; and control means for effecting operation of said pressure means for a predetermined period of time, then removing fressure from each cut section that has been subjected to said timed juice extracting pressure.

References Cited by the Examiner

UNITED STATES PATENTS

| | | | |
|---|---|---|---|
| 765,005 | 7/04 | Gregory | 100—215 X |
| 2,160,523 | 5/39 | Scurlock | 146—3.9 |
| 2,367,859 | 1/45 | Fromm | 100—238 X |
| 2,552,171 | 5/51 | Hagerty | 100—97 |
| 2,667,118 | 1/54 | Nelson | 100—218 X |
| 2,723,618 | 11/55 | Matthews | 100—53 |

FOREIGN PATENTS

| | | |
|---|---|---|
| 700,855 | 1/31 | France. |

WALTER A. SCHEEL, *Primary Examiner.*

UNITED STATES PATENT OFFICE
CERTIFICATE OF CORRECTION

Patent No. 3,185,072      May 25, 1965

Donn J. Rickard

It is hereby certified that error appears in the above numbered patent requiring correction and that the said Letters Patent should read as corrected below.

Column 3, line 37, for "14-15" read -- 14-14 --; column 5, line 16, for "dividend" read -- divided --; column 7, line 44, for "96" read -- 86 --; column 8, line 56, for "78" read -- 88 --; column 9, line 30, for "As" read -- At --; column 12, line 7, for "81" read -- 181 --; column 14, line 34, before "members" insert -- said --; column 15, line 7, for "is" read -- in --; column 16, line 17, for "coopreative" read -- cooperative --; line 18, strike out "and said frame"; column 22, line 41, for "fressure" read -- pressure --.

Signed and sealed this 8th day of March 1966.

(SEAL)
Attest:

ERNEST W. SWIDER
Attesting Officer

EDWARD J. BRENNER
Commissioner of Patents